G. R. Crane.
Harvester Rake.

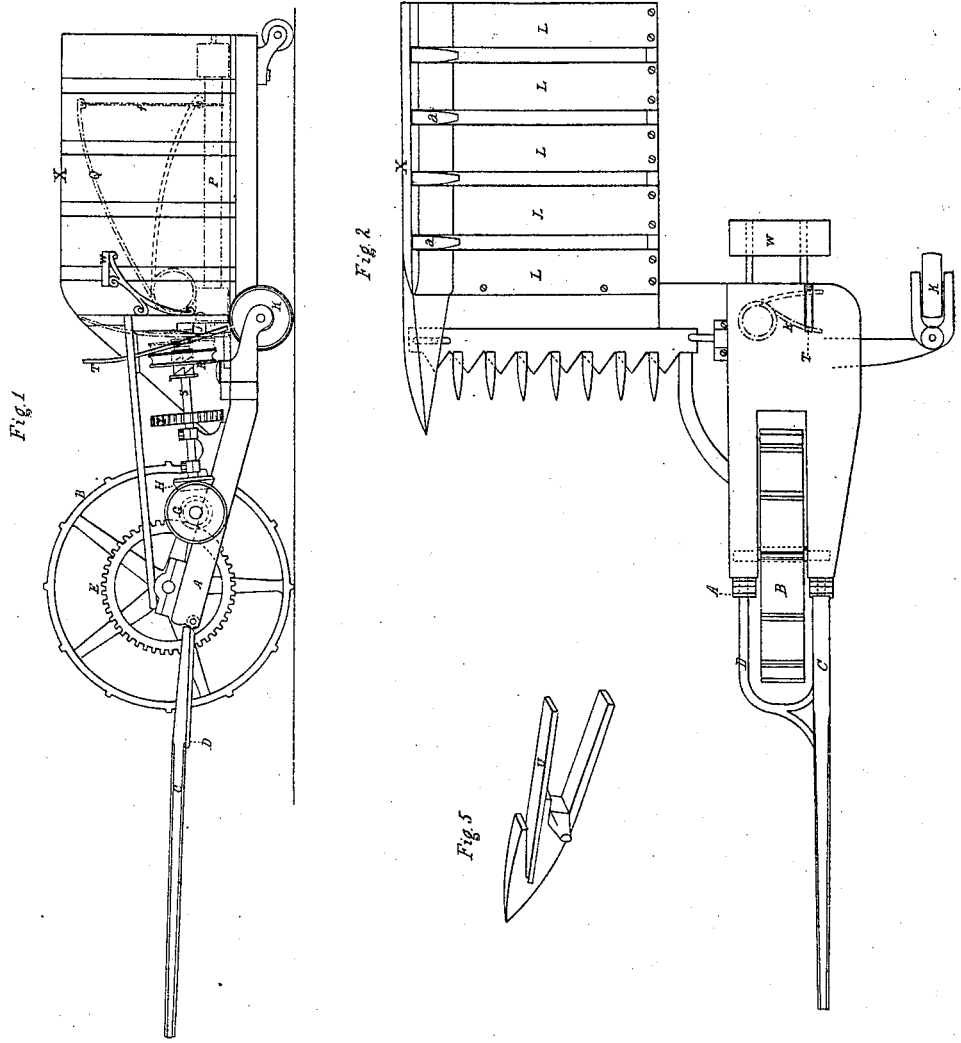

Nº 16789          Patented Mar. 10, 1857.

Witnesses

Inventor
George R. Crane

UNITED STATES PATENT OFFICE.

GEORGE R. CRANE, OF CALDWELL, NEW JERSEY.

IMPROVEMENT IN MACHINES FOR HARVESTING GRAIN.

Specification forming part of Letters Patent No. 16,789, dated March 10, 1857.

*To all whom it may concern:*

Be it known that I, GEORGE R. CRANE, of Caldwell, in the county of Essex and State of New Jersey, have invented certain new and useful Improvements in Machines for Harvesting Grain and Grass, which I have described in the following specification and illustrated in the accompanying drawings with sufficient clearness to enable others of competent skill to make and use my invention.

My invention consists in a certain new and useful improvement in the construction and mode of operating the rake.

Figure 3:
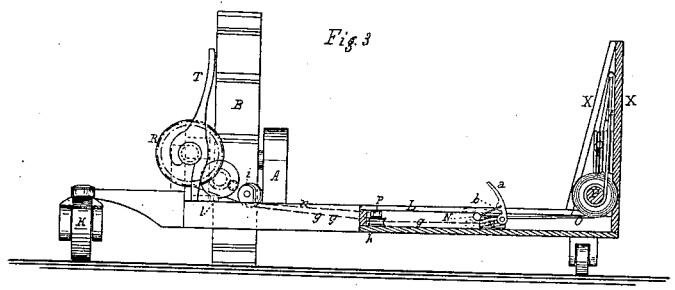
Figure 4:
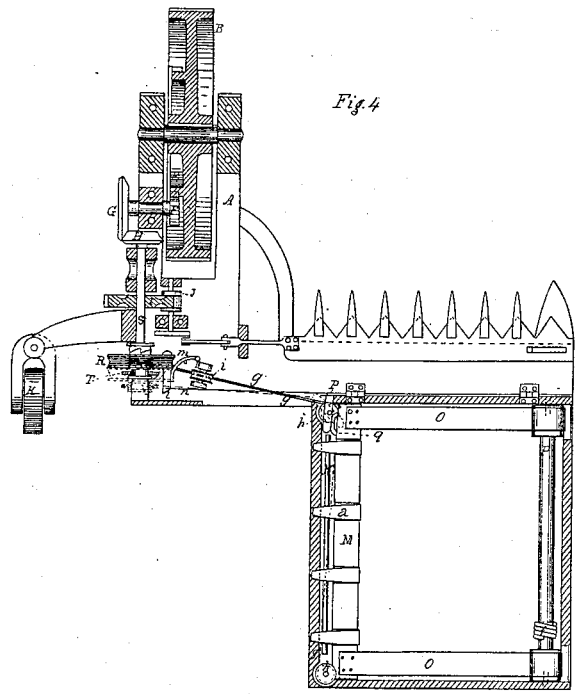

In the accompanying drawings, Figure 1 is a side elevation of my improved machine. Fig. 2 is a plan. Fig. 3 is a sectional rear elevation, showing the construction and mode of operating the rake. Fig. 4 is a sectional plan view devoted chiefly to the same purpose. Fig. 5 is a perspective view of one of the guard-teeth with the cutting-blade attached.

A is the frame in which the traction-wheel B is hung. This frame does not extend forward of the wheel, but only so far forward of the axle as is necessary for the attachment of the boxes. The tongue C is attached to the forward end of this frame upon the left-hand side, and a brace, D, which is attached to and forms part of the tongue, is connected to the frame upon the right-hand side. By this arrangement and method of connecting the tongue to the frame less weight is thrown upon the axle and more upon the back end at the point at which the cutter-bar is attached, and the cutter-bar is thus kept with more certainty to the ground. Motion is transmitted from the traction-wheel by the gear-wheels E F G H I J, to the last of which a crank is attached, which is connected to the cutter-bar.

K is a caster-roller adjustably attached to the frame to raise the cutters to the proper height from the ground to cut grain or grass, as the case may require.

The platform upon which the grain falls, when cut, is hinged to the bar to which the guard-teeth are attached. This platform is made hollow, and the top of it is formed of slats or bars L, with openings between them for the teeth *a* of the rake. These teeth are hinged at one end to the bar M, and are also connected at the middle by the short connecting-rods *b* to the bar N, both of which bars M and N extend nearly the whole length of the platform, and all the teeth of the rake are fastened to them, as described above.

Straps O are riveted to the bar M at each end of said bar, and the end which is not attached to the bar is attached to the roller P, as shown in Figs. 3 and 4. The object of the straps O and the roller P is to draw the rake back to the right-hand side of the platform after it has been moved to the left hand to rake a bundle of grain. To accomplish this object a strong spring, Q, is attached to an upright which rises from the platform, and the end of this spring is connected by the cord *f* to the roller P. The spring Q and the cord *f* are shown in red lines in Fig. 1. They are protected by being inclosed in a narrow box, the advantages of which will be explained hereinafter.

Two cords, *g g'*, are attached to the ends of the bar M, and after passing around the pulleys *h h'* pass under the pulley *i* to the wheel or pulley R on the shaft S. The wheel R is loosely fitted upon the shaft, but may be connected so as to revolve with it, by a clutch-coupling, which is operated by the lever T. This lever is hung to the fulcrum *j*, and a strong spring, *k*, (shown in red lines in Fig. 2,) presses against it to throw the clutch out of gear. When it is thrown in gear it is kept there by the stop *l*, which is kept up to its position by a small spring, *m*. A small iron rod, *n*, connects this stop *l* to the lever *p*. When the pulley R is thrown in gear by pushing the lever T the cords *g g'* are wound upon the pulley R, and the rake is by that means drawn rapidly across the platform. As it arrives near the left-hand side of the platform an iron staple or stop, *q*, strikes the lever *p* and throws the stop *l* out of gear, when the clutch which drives the pulley R is thrown out of gear, and the rake is rapidly brought back by the spring Q to its original position at the right-hand side of the platform, where it remains till the driver, deeming that he has sufficient grain for a bundle, again throws the clutch into gear.

The object of hinging the teeth to the bar M, and by means of the connecting-rods *b* to the bar N, is to cause the teeth to fold down so as to slide under the grain as the rake goes back to its place, and to rise again as the rake is started toward the left-hand side of the machine to rake a bundle of grain. This device answers this purpose admirably, the friction and inertia of the bar N being amply sufficient for the purpose.

The cutters are beveled upon the upper side, and a steel blade, U, attached to each guard-tooth by riveting or otherwise. W is a seat for the driver.

The spring Q and the cord $f$ are, as before indicated, inclosed in the box or divider X, which protects them from the grain through which the machine is passing.

The advantages of this arrangement are obvious. In no other place or position could the spring and cord be so well protected, and at the same time so entirely out of the way; and this box X serves not only to protect these parts, but also divides the cut from the standing grain.

Having thus fully described my invention, what I claim as new, and desire to secure by Letters Patent, is—

Operating the bars M N, to which the rake-teeth $a$ are attached, from left to right, by means of the straps O O, roller P, cord $f$, and spring Q, when the same are constructed and arranged in relation to each other within the divider or shield X, in the manner and for the purpose set forth.

GEORGE R. CRANE.

Witnesses:
   THOS. P. HOW,
   L. A. ROBERTS.